United States Patent [19]
Charles et al.

[11] Patent Number: 5,160,852
[45] Date of Patent: Nov. 3, 1992

[54] POWER ADAPTER

[75] Inventors: Joseph T. Charles, Inverness, Ill.; Michael A. Reinhart, Gering, Nebr.

[73] Assignee: Charles Industries, Ltd., Rolling Meadows, Ill.

[21] Appl. No.: 522,652

[22] Filed: May 11, 1990

[51] Int. Cl.$^5$ .............................................. H02J 3/04
[52] U.S. Cl. .......................................... 307/77; 307/87
[58] Field of Search ................ 307/9.1, 18, 19, 20, 307/23, 29, 43-48, 54-58, 61, 63, 64-68, 71, 77, 80, 87, 127, 130, 131, 147; 361/187

[56] References Cited

U.S. PATENT DOCUMENTS

| | | | |
|---|---|---|---|
| 3,509,356 | 12/1967 | Peebles | 307/42 |
| 3,582,669 | 6/1971 | Dempsey | 307/18 |
| 3,588,519 | 6/1971 | Luebrecht | 307/87 |
| 3,787,730 | 1/1974 | Ray et al. | 307/77 |
| 3,991,320 | 11/1976 | Ross | 307/71 |
| 4,131,805 | 12/1978 | Austin et al. | 307/147 |
| 4,159,503 | 6/1979 | Ross | 361/187 |
| 4,403,292 | 9/1983 | Eizak et al. | 364/492 |
| 4,507,720 | 3/1985 | Colbrese | 363/13 |
| 4,747,061 | 5/1988 | Lagree et al. | 364/483 |
| 4,963,814 | 10/1990 | Parks et al. | 323/274 |

FOREIGN PATENT DOCUMENTS 282146 9/1965 Australia .

OTHER PUBLICATIONS

Product review of "C-Cable Smart Y Adapter", produced by Charles Industries, sold by Charles Marine Products, Rolling Mills, IL., review dated before Jan. 4, 1990.

Charles Industries brochure page on C-Cable Smart "Y", Sep. 1989.

Primary Examiner—A. D. Pellinen
Assistant Examiner—David Osborn
Attorney, Agent, or Firm—Leydig, Voit & Mayer

[57] ABSTRACT

An adapter for connecting an electrical load which is mobile, such as the electrical system of a pleasure craft, to a stationary power source, such as the electrical pedestal at a marina. In its preferred embodiment, the adapter serves to connect a higher voltage load (such as a 240 volt electrical load of a pleasure craft) to a pair of conventional 120 volt sources. Input cables include a pair of connectors for independent connection to sources on the pedestal. Isolation means within the adapter serves to isolate the input connectors from each other during the connection operation such that a user holding one connector while connecting the other will not receive an electrical shock. Sensing means within the adapter determines that the sources are in the proper relationship to sum to the level required by the mobile load. When the sensing means determines that the sources are connected and in the proper relationship, contacts are closed connecting the summed inputs to the output for driving the load.

9 Claims, 4 Drawing Sheets

POWER ADAPTER

FIELD OF THE INVENTION

This invention relates to power adapters, and more particularly to a portable adapter for powering a mobile electrical load from a pair of combined stationary sources which can be interconnected to meet the requirements of the load.

BACKGROUND OF THE INVENTION

Power adapters such as the type to which the present invention is directed find application in mobile vehicles which are equipped with significant electrical and electronic equipment. A typical example is a pleasure boat which can be equipped with navigational equipment such as radio and radar, kitchen appliances such as a cooking range and refrigerator, entertainment equipment such as television, and stereo, and other such electrical and electronic equipment. When the craft is in use, the craft engine usually powers a generator which produces output power capable of driving all of those devices. However, when the craft is docked at a marina, it is typical to derive power for the onboard electrical equipment from a stationary source, such as a dockside electrical pedestal at the marina. The marinas are usually equipped with 120 volt power. If all of the appliances on board the craft are also 120 volt devices, and if the power distribution system on the craft is a simple 120 volt system, a docking connector on the craft can be connected to the pedestal at the marina and all of the devices will have power available.

However, if the craft has 240 volt (or 208 volt) equipment, or if the power distribution system on the craft is a 240 volt distribution system, the operator of the craft cannot simply connect a docking power connector on the craft to the pedestal. Marinas have, however, often provided separate 120 volt outlets on the pedestal wired from two phases of a three phase supply so that appropriate voltages are available for powering the equipment on a craft which requires a 240 volt supply. However, those two out-of-phase sources must be connected together in an appropriate manner before they are useful for powering the 240 volt equipment on the craft. Typically, the pedestal simply has the two out-of-phase 120 volt sources brought out to separate receptacles, so that they can be used in the ordinary way for powering 120 volt equipment. If, as is typical, no provision is made for combining the two out-of-phase sources at the pedestal for powering the 240 volt craft, the user is faced with the problem of wiring the two sources together external of the pedestal and bringing the connected sources to the craft. Even if the user had anticipated the problem to the extent of having a harness wired such that input cables for connecting to the pedestal are jumpered together and to an output cable for connection to the craft, the user may expose himself to the danger of shock or injury during the connection process. More particularly, it may not be readily appreciated by the user that when one of the plugs is inserted into a live socket in the pedestal, live voltage can also appear on the other plug; if the user has his body in contact with the electrical prongs of the unconnected plug, he is subjected to the danger of receiving an electrical shock.

As another example, in the case where a marina has 240 volt power but at an insufficient current level for driving all of the appliances on a craft, and the craft is not configured to split the appliances between a pair of power outlets, it is desirable to combine a pair of 240 volt outlets, say each of 50 amp capacity, to provide a 240 volt, 100 amp combined service. As in the prior example, if the sources are not properly wired together, problems can arise both in potential damage to the equipment and harm to the user.

Not all marinas are necessarily wired according to a particular standard, or wired by qualified electricians. If a user attempts to connect to a marina power source which is improperly wired, additional problems can result. In a voltage summing implementation, if the electrical sources from the two selected receptacles are not from different phases, the summed output voltage will not be adequate to drive the equipment on the craft. In a current summing implementation, if the sources from the two selected receptacles are not from the same phase, a phase-to-phase short is possible. Additional problems can result if one of the voltage sources, although of the proper phase, is wired with its polarity reversed. These and other problems can lead to a situation where the user is not adequately advised of the nature of a problem when one exists, and is thus not adequately equipped to deal with an improper connection when jumpering two sources to drive a load. Without adequate information as to what is wrong—the phase, the polarity, a tripped circuit breaker, a potential problem in the equipment onboard, the user may know little more than the fact that certain equipment on the craft is not operating properly. Without substantial experience or additional assistance, he will not be able to readily ascertain whether the problem is in the craft, in the connection, in the pedestal, in the power source back at the marina, etc. The natural response of unconnecting and reconnecting the various plugs in different configurations might lead more directly to additional problems than to a solution.

SUMMARY OF THE INVENTION

In view of the foregoing, it is a general aim of the present invention to enable an electrically unskilled operator to safely and reliably connect an electrical load of one characteristic to a pair of electrical sources of a different characteristic.

An object of the invention is to provide an adapter for reliably connecting an electrical load of one characteristic to a pair of electrical sources of a different characteristic, in a manner which protects the operator and advises him of the operability of the connection.

In that regard, it is an object of the present invention to provide a power adapter which connects an electrical load of a predetermined characteristic to a pair of electrical sources of a different characteristic, the adapter serving to protect the user from shocks due to contact with any of the electrical plugs during the installation operation.

According to the invention, it is a further object to provide such an adapter with indicator means indicating the operative or inoperative status of the adapter and further suggesting the nature of the particular problem with an inoperative connection.

According to one aspect of the invention, it is an object to provide a power adapter for use with a mobile vehicle, such as a pleasure craft which has onboard electrical appliances, the adapter being capable of driving those appliances from a standard stationary electrical source by reliably and safely interconnecting two phases from the source to assure that they sum in a predetermined manner to produce a power output capable of driving the equipment on the craft.

In accordance with the invention, there is provided an adapter for connecting an electrical load of a given characteristic to a pair of electrical sources of a characteristic different from the given characteristic. The adapter functions to sum the sources in a predetermined manner to produce a desired output. First and second input connectors are provided for connection to the respective electrical sources. Isolation means prevents feedthrough of one electrical source to the other connector when only one of the source connections is made. Sensing means responds to a relationship between the sources which indicates that the sources will sum to produce the desired output. The sensing means drives output means which connect the summed inputs to the output for driving an electrical load which is connected to the output.

In a presently preferred embodiment of the invention, the electrical characteristics are the voltage level, and the pair of inputs are out-of-phase in order to sum to a higher output voltage level than the input sources. As an alternative, the characteristic to be summed is current, in an implementation where the load has a current requirement which is greater than that which can be supplied by a single source. In that case, the sensing means assures that the sources are of the same phase before connecting them for summation.

It is a feature of the invention that isolation means prevents electrical shocks to the user which might be occasioned by plugging one of the input connectors into a live source while holding the other in the hand.

It is a further feature of the invention that the adapter provides indicator means which suggest to the user the nature of a problem if a connection has been improperly made.

Other objects and advantages will become apparent from the following detailed description when taken in conjunction with the drawings, in which:

While the invention will be described in connection with certain preferred embodiments, there is no intent to limit it to those embodiments. On the contrary, the intent is to cover all alternatives, modifications and equivalents included within the spirit and scope of the invention as defined by the appended claims.

DETAILED DESCRIPTION OF THE PREFERRED EMBODIMENTS

Figure 1:
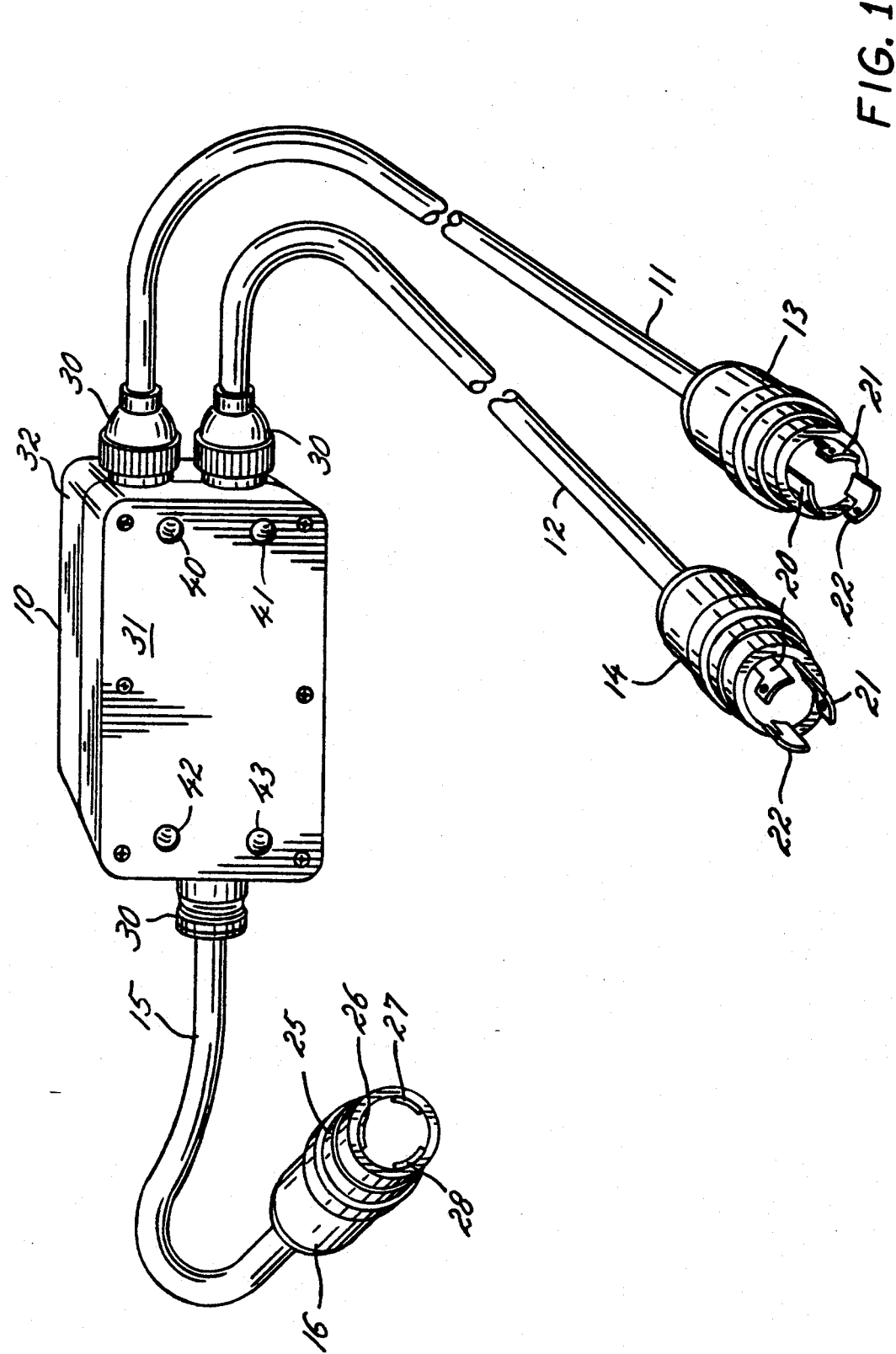
FIG. 1 is a perspective view showing a power converter exemplifying the present invention.

Turning now to the drawings, FIG. 1 illustrates the external configuration of a power adapter exemplifying the present invention. Adapter circuitry is housed in a junction box 10 which also serves as a terminating point for input and output cables. The junction box 10 has sufficient size and weight that it can be placed in a desired position adjacent a marina power pedestal when in use, and be expected to remain there. When placed in that position, a pair of relatively short input cables 11, 12 extend to the outlets in a power pedestal (not shown) at the marina, and connectors 13, 14 mated with standard electrical receptacles in the pedestal. An output cable 15 has sufficient length to extend to the craft, and has a standard plug 16 which mates with a docking plug (not shown) on the craft so that power received on the input cables 11, 12 which is summed by circuitry within the junction box 10 is switched to the output cable 16 and via the connector 16 supplied to the electrical devices on the craft.

The connectors 13, 14 on the input cables 11, 12 are illustrated as polarized units with ground pins 20 serving to key the connector and make connection to ground in the shore supply. The additional exposed contact blades 21, 22 are adapted to connect the input cables to shore power. One of the contacts of each plug, say contact 21, is adapted for connection to the nongrounded or live terminal of the power source and the other contact 22 adapted for connection to the neutral of that phase. In one embodiment of the invention, the plugs 13, 14 are adapted for connection to two different phases of the shore power so that the voltage of the two out-of-phase supplies will add to produce a higher voltage at the output. In that embodiment, it is preferred to use 120 volt sources to produce a 240 volt output. In a variation on that embodiment, nominal 110 volt sources can be used to produce a 208 volt output. In a further implementation of the invention, the plugs 13, 14 are adapted to be connected to sources which are in the same phase, such that when the sources are summed by circuitry in the junction box 10 the power at output plug 16 will be at the same voltage as the voltage applied to the input connectors 13, 14 but at a substantially higher current. In that embodiment, for example, a pair of 50 amp sources can be connected to the plugs 13, 14 to produce a 100 amp capacity service at the output plug 16.

The output cord 15 also is provided with a standard connector, preferably of different configuration than the standard input connectors 13, 14. In one embodiment, the output connector 16 has four contacts, a ground output being connected to the body 25, a neutral connection being connected to a polarizing contact 26, and the summed output voltage being connected across a pair of contacts 27, 28. Other electrical connections will also be apparent to those skilled in this art.

It is preferable that the cords 11, 12 and 15 as well as the connectors 13, 14 and 16 be of the molded variety to exclude moisture so that they are safe for use in a marine environment. Similarly, strain relief connectors 30 which join the input and output cables to the junction box 10 are sealed in a waterproof manner. The sealed connectors 30 in combination with appropriate gasketing which seals a cover 31 to a base member 32 to form the junction box 10 preferably provides a watertight assembly which will readily withstand a damp environment for extended periods of time.

As will be described in greater detail below, the invention provides for indicator means to advise the operator that the connections are appropriately made or, when a problem exists, to give an indication as to the nature of the problem. FIG. 1 illustrates the preferred form which includes a pair of indicators 40, 41 associated with the input side, and a further pair of indicators 42, 43 associated with the output side. In the preferred form of the invention, an input indicator is provided for each of the input source cables, and is configured so that the associated input indicator is illuminated when the associated cable is connected to a live source. Thus, when connector 13 is connected to a live source in a pedestal, the input indicator 40 will light. Similarly, the indicator 41 will light when live voltage is present on connector 14. The failure of either indicator to light is a signal that either the connection is not correctly made at the pedestal or that something is amiss in the shore power system.

In the preferred embodiment, a pair of indicators 42, 43 are provided for the output side to independently signal that power supplied from the respective input cables 11, 12 is being applied through the internal circuitry to the output connector. Thus, if both of the input indicators 40, 41 are glowing, that is a sign that both inputs are live. If both of the indicators 42, 43 are also glowing, that is a sign that the output is functional and all of the equipment on the craft should be functional. If an input indicator is not illuminated, the input connection or the source itself should be checked. If the input indicators are glowing but one or both of the output indicators are not, that is a sign that one or both (depending on which of the output indicators is not illuminated) of the sources does not have the proper phase or polarity to contribute in the desired manner to the output sum.

It is seen from FIG. 1 that the output connector 25 is preferably constructed with all of the electrical contacts recessed so that they are relatively safe insofar as the danger of electrical shock is concerned. It will further be described below that it is preferred that the circuitry within junction box 10 include mechanical switches connected to the output cable 15 so that output power is not applied to that cable until it is assured that the input connections are properly made. Thus, the operator will be substantially protected from electrical shock from the output power cord.

However, it is seen that the input connectors 13, 14 must have exposed contact blades in order to mate with conventional receptacles found on power pedestals. If the junction box 10 contained no more than a series of jumpers for appropriately connecting the input and output cords in series or parallel as necessary, it will be appreciated that when one of the plugs was connected to a live source, power would also be applied to the non-connected plug 14, raising the danger of electrical shock. It is a feature of the invention that the electrical plugs are isolated one from the other during the connection operation such that even when a live source is connected to one, the other remains isolated, even though the voltages from the plugs are being summed or compared internally in order for the adapter to perform its function.

Figure 2:
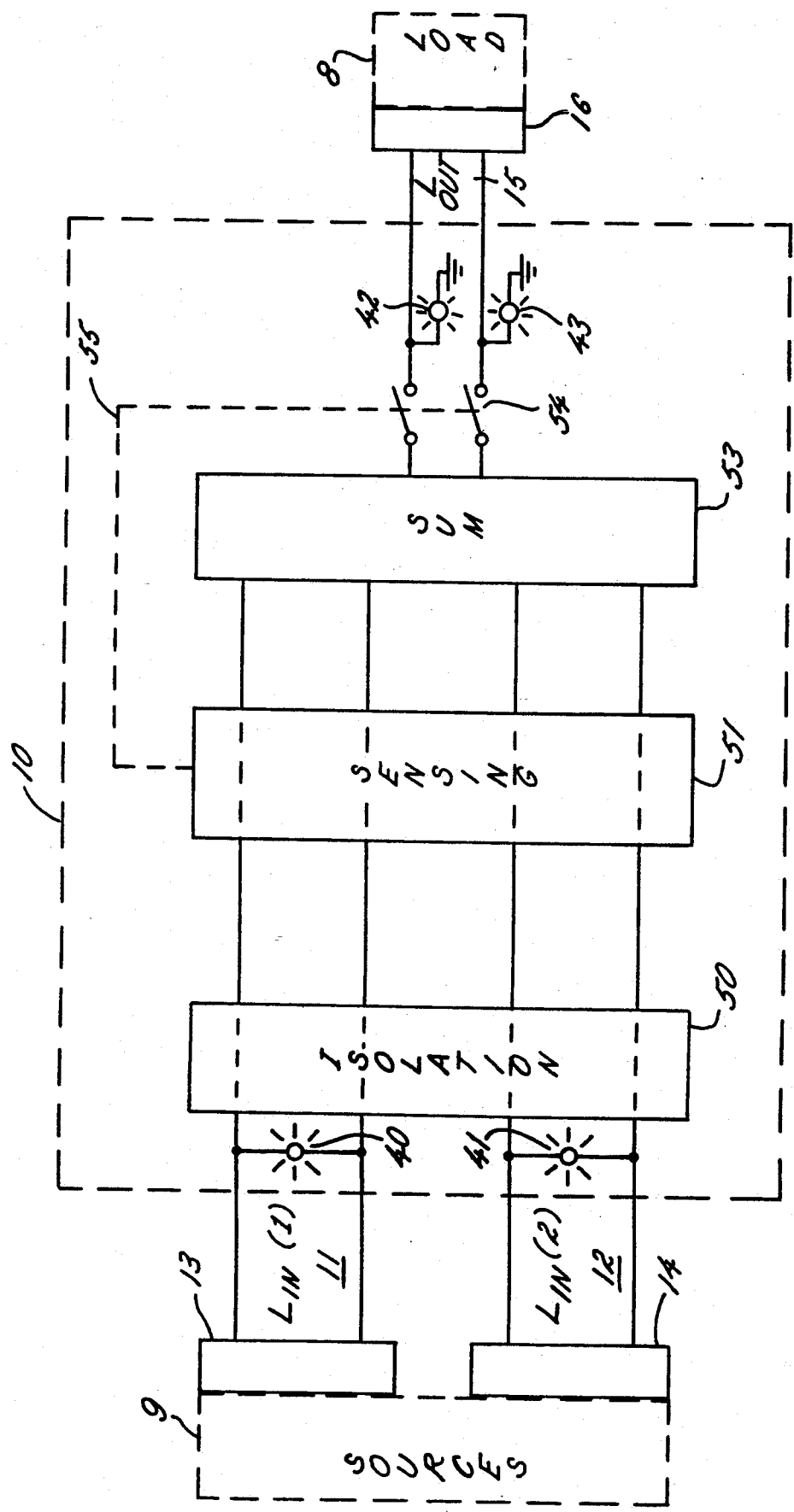
FIG. 2 is a block diagram generically illustrating the electrical structure of a power circuit according to the present invention.

The manner in which those functions are performed will be better understood with reference to FIG. 2, which illustrates in block diagrammatic form the main internal circuit elements located within junction box 10. It is seen that the junction box 10 occupies a central part of FIG. 2, the electrical sources 9 (e.g., the marina pedestal) are located at the left of the drawing and the electrical load 8 (e.g., the electrical equipment on the craft) is shown at the right of the drawing. Input connectors 13, 14 are diagrammatically illustrated as providing two sources of input power designated S₁ and S₂. In the most typical configuration, S₁, S₂ are each 120 volt 60 Hz power supplies. Thus, the 120 volt sources are provided by means of cables 11, 12 as inputs to the junction box 10. The junction box 10 has a single output shown as cable 15 coupled by means of schematically illustrated connector 16 to the electrical load 8. In the currently preferred embodiment of the invention, when the two input sources S₁, S₂ are each 120 volt 60 Hz sources, the load 8 is a 240 volt 60 Hz load. It is, however, possible, as will be described below, to sum a pair of sources in such a way as to sum the current as opposed to the voltage.

In either event, however, the junction box 10 includes four functional circuit elements illustrated as isolation means 50 which functions to isolate one input plug from the other during the connection process, sensing means 51 which functions to sense the nature of the inputs or their summation to determine if the summed inputs are connected in such a way as to provide the desired output, summing means 53 which serves to sum the inputs in the predetermined manner desired by the output, and switch means 54 which serves to connect the summed inputs to the output when the sensing means determines that the inputs are properly connected.

The circuit elements which perform those functions will be described in greater detail in connection with FIGS. 3 and 4. However, for a better understanding of the invention, the functional nature of the elements will first be described in connection with FIG. 2. That description will first take place in the context of the currently preferred mode of the invention wherein the inputs are of the same voltage and frequency but different phase and it is desired to produce an output in which the output voltage is the RMS sum of the input voltages. A desirable implementation of that embodiment is a unit wherein the input voltages are 120 volts, 60 Hz, 30 amps each and the output voltage is 240 volts, 60 Hz, 30 amps.

The isolation means 50 in such an embodiment is interposed between the input cables 11, 12 and the remainder of the circuitry in junction box 10. Thus, when only one of the source connections is made, e.g., connector 13 is plugged into the appropriate socket of the source 9, no live voltage appears on connector 14. Without the isolation means, the sensing means and summing means would tend to bring the connectors electrically together, raising the hazard of electrical shock for the user.

It is convenient to associate input indicators 40, 41 with the isolation means 50, and such indicators are schematically illustrated in FIG. 2. It will thus be appreciated that when one of the power cords has its associated connector plugged into a live source, the associated indicator will be caused to glow. The fact that an indicator 40 or 41 is glowing is an indication that the source to which it is connected is live.

In practicing the invention, the sensing means senses not only the fact that the inputs are live, but also that they are in the proper relationship to produce the desired sum. Thus, when a voltage summing adapter is implemented, it is necessary for the pair of inputs to be of different phases. The difference in phase is detected in sensing means 51. If the phases are the same, even though the indicators 40 and 41 are glowing, the lack of phase difference will be determined in sensing means 51, and the summed inputs will not be connected to the output because voltages of the same phase will add to produce a voltage which is near zero. However, if the voltages are out-of-phase, such as the inputs being two legs of a three phase supply and therefore approximately 120° out-of-phase, the sensing means 51 will detect this phase difference, and will thus determine that the two 120 volt out-of-phase inputs will add to an output of approximately 240 volts. In response, the sensing means 51 will actuate the output switching means 54. The control of the switching means 54 by the sensing means 51 is indicated by dotted line connection 55.

The summing means 53 serves to sum the inputs in the desired manner to produce the output. In the voltage summing application, the summing means 53 serves to add the out-of-phase voltages to produce the desired output which is approximately twice the voltage magnitude of each input. As will be described in greater detail below, the summing means 53 cooperates with the sensing means 51 to assure that the voltages are not only out-of-phase, but that the inputs are at the proper polarity so that the sum will indeed add to approximately twice the input voltage. The sensing means 51 prevents connection of inputs of improper phase or polarity, and thereby prevents damage to the internal components as well as potential damage to the connected equipment.

It is seen that connected intermediate the output switching means 54 and the plug 16 are the output indicators 42, 43. Separate output indicators 42, 43 are provided in the illustrated embodiment to assure that both switches have closed, and that both lines are indeed supplying current with respect to ground. In some embodiments, only a single indicator need be provided, but it is believed that in certain applications the dual output light feature will provide additional troubleshooting capability.

In that regard, it is of course possible to configure the system with somewhat less capability by providing less versatile indicators. In a simple implementation, it will be possible to provide only a single indicator. Such an indicator can be driven from a number of elements, such as from the sensing means 51 and thus will be illuminated only when both sources are connected and are determined to be in the proper relationship to produce the desired sum. While certain benefits are lost by using only a single indicator, such as the ability to immediately indicate whether a faulty connection is input or output related, the simplicity of a single light system in combination with the foolproof features attributable in large measure to the isolation means combined with the sensing means, will provide substantially greater safety and capability than has been available heretofore. However, it is currently preferred to provide separate indicator capability which clearly show that each of the inputs is properly functioning and to separately indicate that the output is also active.

It is noted that the input voltages initially provided on cables 11, 12 are connected to each of the elements 50, 51 and 53, but dashed lines in FIG. 2 show the interconnection through those elements. The manner of illustrating the connections is intended to emphasize that the order of the elements is not essential. The isolation means of course must prevent live voltages from the circuitry within the junction box from appearing on an unconnected plug. The order of the sensing and summing means, however, can differ depending on the application. For example, it may be desired to sum the inputs before sensing the nature of the sum in some applications. In others, it may be appropriate to sense the nature of the inputs before allowing the summation to be made. In any event, the dashed and solid lines are intended to illustrate that the order of the elements can be changed as has now been described.

As an alternative embodiment of the invention, the characteristics of the output and input which are intended to differ from each other need not be the voltage as has been described above but can be the current capacity. In this embodiment, it may be desirable, for example, for both of the inputs as well as the outputs to be at the same voltage level, such as 120 or 240 volts, but to have the current capacity of the output greater than the current capacity of either input. As an example, it may be desired to drive a 240 volt, 100 amp load from a pair of 240 volt, 50 amp sources. In that application, it is desired to connect both plugs 11 and 12 to different sources but which are at the same phase. The isolation means 50, as in the prior embodiment, prevents feedthrough of power from one source for which a source connection has been made to the other non-connected plug. The sensing means 51 in this alternate embodiment, however, senses the relative phase of the inputs to determine that the inputs are indeed in phase. It is only when the inputs are determined to be in phase by the sensing means 51 that switch means 54 is operated to connect the summed inputs to the output connector 16. The summer 53 in that case serves to sum the in phase inputs, assuring proper polarity of the connection before the summation is made to produce a current supply to the output which is greater than the current capacity of either of the input sources individually. The summer 53 in that embodiment can additionally utilize means for assuring load sharing between the sources.

Figure 3:
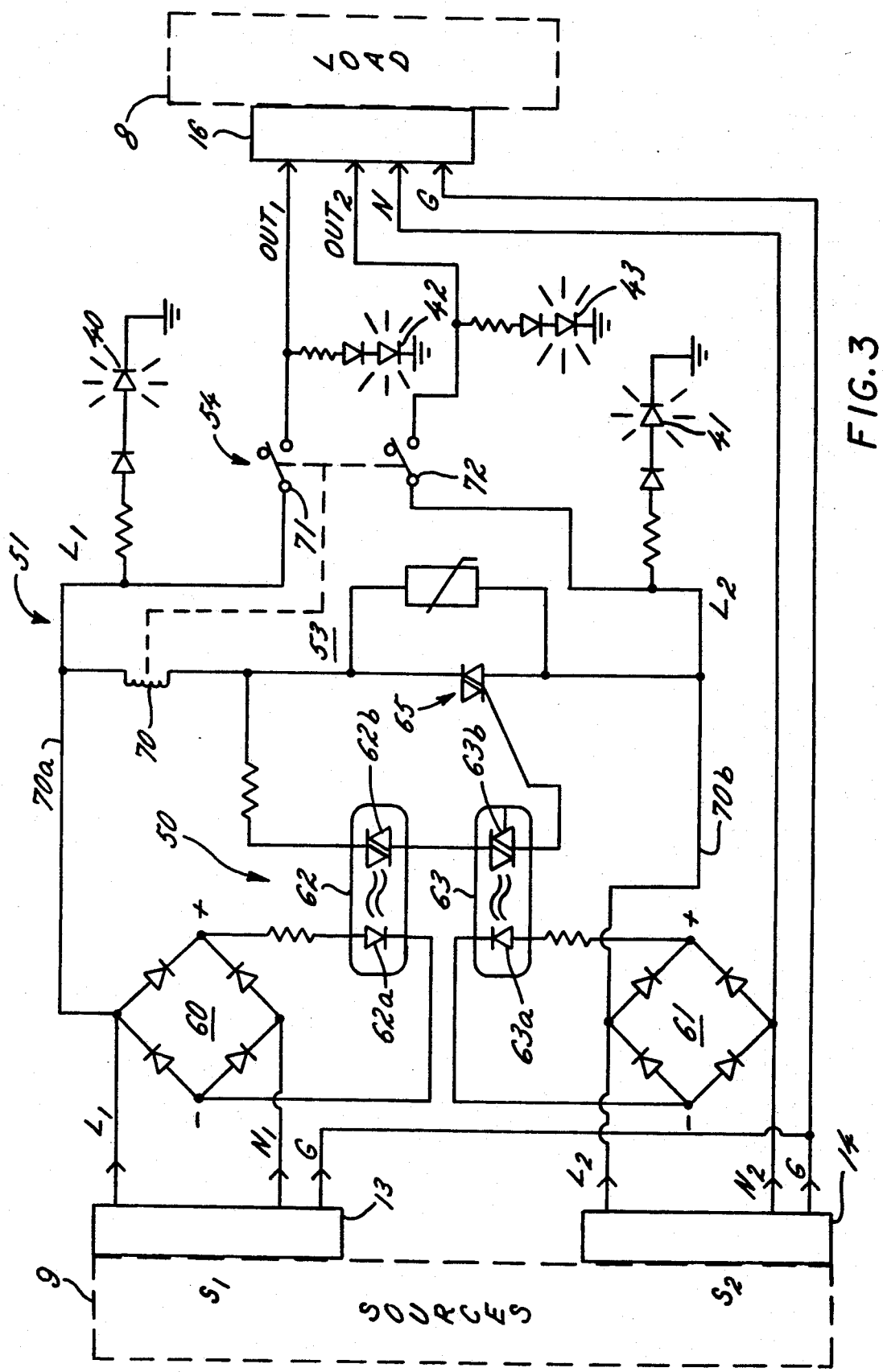
FIG. 3 is a circuit schematic diagram illustrating a preferred circuit used to implement a power adapter according to the present invention.

Turning now to FIG. 3, there is shown a more detailed circuit diagram of a system exemplifying the present invention. The illustrated system relates to the voltage summing implementation of the invention which is presently the preferred embodiment.

Like FIG. 2, FIG. 3 shows input plugs 13, 14 for connection to respective receptacles of the electrical sources 9, an output plug 16 for connection to the load 8. A separate showing of input and output cables, junction box and the like are omitted for purposes of clarity. It is seen that each of the source connections is made by way of isolation means generally indicated at 50. In the illustrated embodiment, it is preferred to include in the source connections a pair of diode bridges 60, 61 which serves to convert the input AC to DC for further processing by the isolation means. Thus, it is seen, for example, that bridge 60 is connected across one of the sources from $L_1$ to $N_1$, i.e., from line to neutral, and the other bridge 61 is similarly connected across the second input source from $L_2$ to $N_2$. The outputs of the respective bridges drive the inputs of associated optoisolators 62, 63, respectively. Current limiting resistors are provided as necessary. Thus, when input plug 13 is connected to an appropriate power source, the AC voltage supplied as an input to bridge 60 is converted to DC which illuminates the light-emitting diode 62a of optoisolator 62. As a result, the output switch 62b is closed whenever the plug 13 is connected to a live source. Digressing for a moment to the upper right-hand portion of the drawing, it is seen that LED 40 is also connected to the output of the bridge and thus will be illuminated whenever plug 13 is connected to a live source.

The lower connector 14 is provided with a similar circuit arrangement and includes a diode bridge 61 having the input elements 63a of an optoisolator 63 connected thereacross. Thus, whenever plug 14 is connected to a live source, the output element 63b of the optoisolator 63 will a conductive condition. The input indicator 41 associated with plug 14 is connected similarly to indicator 40 such that the indicator 41 will be illuminated whenever the plug 14 is connected to a live source.

In accordance with an important aspect of the invention, the isolation means 50 is configured to assure that no substantial current is coupled between the input plugs 13, 14 when only one of the plugs is connected to a live voltage source. The isolation means is implemented in part by optoisolators 62, 63 which provide enabling signals to an input switch means 65 which, in the illustrated embodiment, serves as a further element of the isolation means. It is seen that the switch means 65, illustrated in the form of a triac, has its load terminals connected across the $L_1$, $L_2$ bus, and has its gate connected to the series combination of the output switching elements 62b, 63b of the optoisolators 62, 63. The triac 65 will remain in the open circuit condition for so long as no gate signal is applied. As a result, no connection will be made across the bus comprising lines $L_1$, $L_2$, for so long as the triac 65 remains non-conductive. The triac 65 is driven into conduction only when it is provided with gate drive by means of both of the optoisolators 62, 63 being simultaneously in the energized condition. It will now be apparent that such condition can only occur when both of the input plugs 13, 14 are connected to live power sources. When both connections are made, the output elements 62b, 63b are both conductive, providing gate, drive to the triac 65 and switching that element on. At that time, the sum of the voltages $L_1$, $L_2$ appears across the coil of a voltage sensitive relay 70 which is an element of the sensing means 51 in the illustrated embodiment. The relay coil 70 is a voltage-sensitive element in the illustrated embodiment which requires greater than about 150 volts to activate the relay. Thus, if 120 volts or less is present the relay will remain deactivated and the associated contacts 71, 72, which form the output switching elements 54 will remain in the open condition. However, if a voltage greater than about 150 volts is imposed across the relay coil 70, the relay will operate to close the contacts 71, 72 and thus connect the contacts of the output plug 16 to the summed voltages. Thus, the voltage sensitive relay 70 serves to sense voltage directly, but due to the fact that the sensing level is set above that of either input, serves to indirectly sense phase by requiring the two sources to be of different phases before the relay will actuate. It will be apparent that the voltage level at which the sensing means 70 operates can be selected by appropriate configuration of that element. It is desirable in a highly reliable power type device such as that illustrated in the drawings to utilize a voltage sensitive relay. However, if greater control over the particular voltage level is desired, or means are provided for sensing input phase directly, other electronic means can be utilized.

In practicing the invention, the summing means 53 is implemented in the circuit of FIG. 3 by means of the interconnections of the input lines $L_1$, $L_2$ with the output lines $Out_1$, $Out_2$, and the intermediate elements such as the switch means 65. Thus, it is seen that the summed voltages which appear across the voltage sensing relay coil 70, can be considered a bus having a pair of terminals 70a, 70b, and the voltage across that bus is sensed across the relay coil 70 whenever the triac 65 is conductive. It is seen that the voltage across that bus 70a, 70b is also applied directly to the output lines $Out_1$, $Out_2$ whenever the switch 54 is closed. The direct connection between the two input lines $L_1$, $L_2$ and the output lines $Out_1$, $Out_2$ operating in conjunction with the sensing means 51 serves to assure that the summed voltages which appear at the output lines $Out_1$, $Out_2$ are indeed the desired sum. More particularly, and for an example, if one of the inputs, for example input 2, is connected in reverse polarity, the system will prevent the switch means 54 from being operated. If $L_2$ and $N_2$ are reversed in the pedestal and the connector 14 mated with a receptacle in that pedestal, the bridge 61 will still produce a DC output and the optoisolator 63 will respond. When the second plug 13 is also connected, both optoisolators will be conductive and the triac 65 will be gated. However, because one of the inputs is of reverse polarity, the voltages will not sum in the summing means 53 to produce a summed magnitude capable of activating the sensing means 70. In other words, bus 70b instead of being connected to $L_2$ will instead be connected to $N_2$ and there will only be approximately 120 volts RMS appearing across the bus 70a, 70b, and that connection to the voltage sensitive relay 70 will prevent activation of the switching means 54.

Similarly, if both of the inputs are of the same phase even of the correct polarity, the AC inputs across bus 70a, 70b will track each other, producing an RMS voltage across sensing means 70 which will be incapable of activating that device. Thus, the nature of the connection between the sources and the sensing means 51 will serve to prevent actuation of the output switching means 54 when both inputs are of the same phase.

Summarizing briefly with respect to FIG. 3, it is seen that there are provided two separate inputs for connection to a pair of electrical sources of a given characteristic. Isolation means 50 maintains isolation between the connectors during the connection operation such that when one of the connectors is connected to its source, voltage is not fed through to the other connector. The isolation means 50 cooperates with sensing means 51 which determines from the characteristics of the input sources whether the sum of those sources will satisfy the desired output characteristic. The FIG. 3 embodiment illustrates a voltage summation implementation wherein the input sources must be out of phase in order to satisfy the requirements established by the sensing means. As an alternative, it may be desired to sense inputs of the same phase to provide for a current summation output.

The sensing means, if it determines that the input sources are in the appropriate relationship, then activates switch means 54 which connect the summed inputs to the output. Internal summation means 55, in the form of interconnections between the sources, the sensing means and the output serves to produce the appropriate sum. In the FIG. 3 embodiment, the appropriate sum is the summation of the two voltage sources in appropriate phase such that, for example, a pair of 120 volt inputs will produce a 240 volt output.

Figure 4:
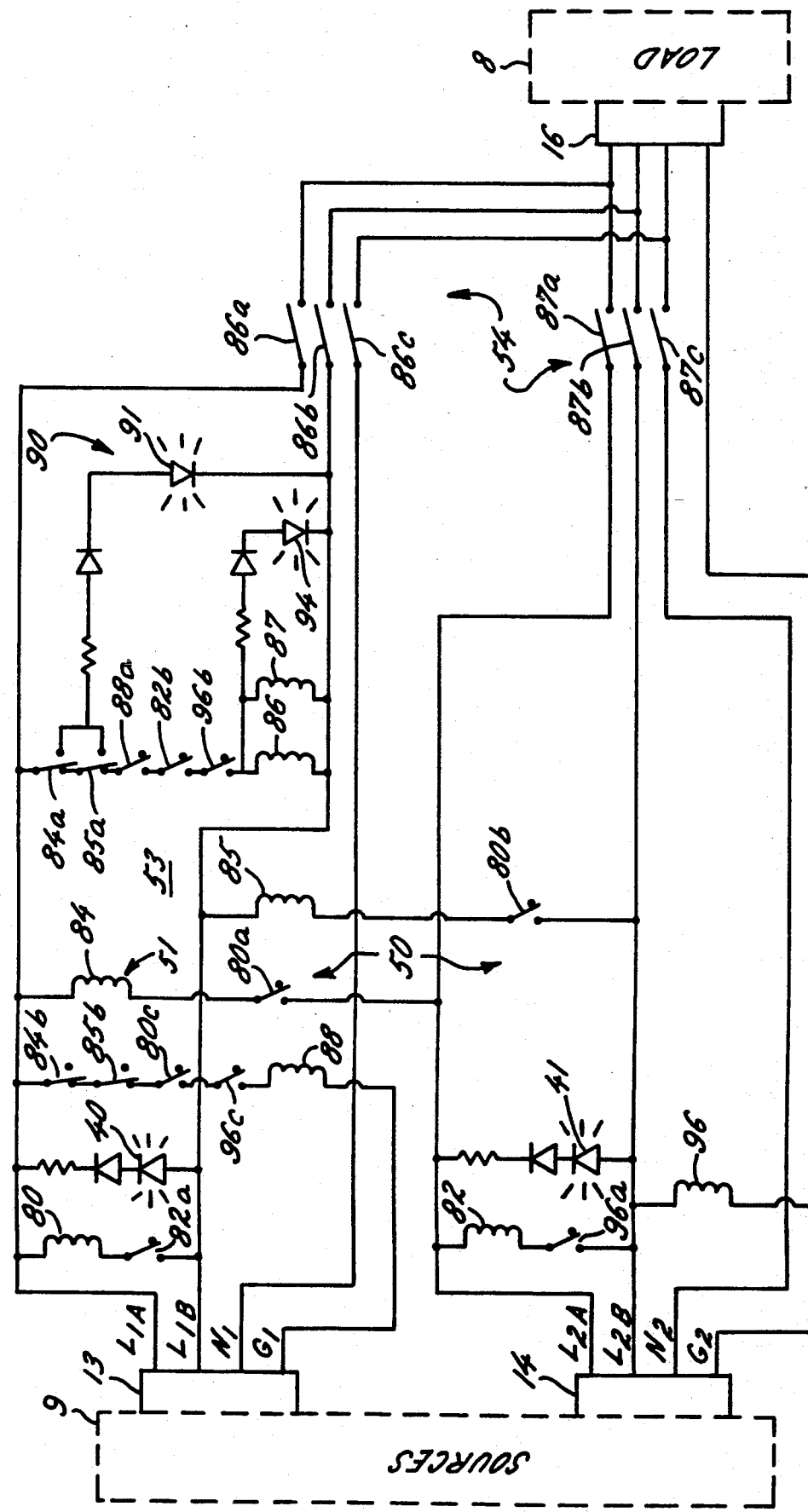
FIG. 4 is a circuit schematic diagram illustrating an alternative circuit used to implement a power adapter according to the present invention.

FIG. 4 illustrates an alternative embodiment of the invention intended to sum current from a pair of sources of the same voltage and polarity in order to produce an output service having twice the current capacity as either input source. For example, if a pair of 240 volt, 50 amp, 60 Hz sources are connected to the input, an output service of 240 volt, 100 amp, 60 Hz will be provided.

As in the prior illustrations, a pair of input plugs 13, 14 are connected to a power source 9, and an output connector 16 to a load 8. In the illustrated embodiment, both sources are two-phase sources, such that the A and B lines of each source are of different phases, such as 120° out of phase. However, in order to provide appropriate summing, the phases of the respective sources must be the same, i.e., $L_{1A}$ and $L_{2A}$ must be of the same phase and similarly, $L_{1B}$ and $L_{2B}$ must be of the same phase, but phase displaced from $L_{1A}$ and $L_{2A}$. It is seen that input indicators 40, 41 are connected across the respective sources (with appropriate current limiting and rectifying means). Thus, when the associated plug is connected to a live source, the appropriate indicator will glow as in the previous embodiment.

In the current summing implementation of FIG. 4, it is desired to connect two sources of the same phase relationship in parallel, and the isolation means 50 is shown associated with summing means 53 intended to make that connection while isolating one plug from the other during the connection operation. To that end, a pair of relay contacts 80a, 80b are interposed between the input circuits and are normally maintained in the open condition. As will become more apparent, the coil 80 of the relay is maintained in the de-energized condition while the input plugs are being connected, in order to maintain the contacts 80a, 80b open and thus isolate one plug from the other. Thus, until coil 80 is energized, both contacts 80a and 80b remain open, completely electrically isolating the plugs 13 and 14 from each other. Closing of the contacts 80a, 80b serves to energize sensing means 51 which is connected by summing means generally illustrated at 53 to assure that the sources connected to the plugs 13, 14 are in the proper relationship, in the current embodiment in the same phase and at the same voltage, before energizing the output switching means 54.

In greater detail, it is seen that when plug 14 is connected to a live source, in addition to illuminating the LED 41, a relay coil 96 connected from $L_{2B}$ to $G_2$ is energized, serving to close contacts 96a which energizes relay coil 82. Other contacts 96b and 96c also close, but without effect at this time. Energization of coil 82 also closes a set of contacts 82b which prepares a main output contact closing circuit for closing.

Focusing first on closing of the contacts 82a, after such contacts are closed, it will be appreciated that connection of plug 13 to a live source will thereupon energize relay coil 80, closing contacts 80a, 80b as described above. Closing of contacts 80a, 80b, in turn, by virtue of the connections provided by summing means 51, bridges relay coils 84, 85 between the input source circuits in order to sense and compare the phases and voltages of the input circuits. The relay coils 84, 85 thus serve as sensing means in the illustrated embodiment to determine that the inputs connected to the plugs 13, 14 are in the appropriate relationship (in the illustrated embodiment of the same phase and voltage) in order to assure that the sources will add to produce the desired current summation at the output. Thus, relay coil 84 is connected between the lines $L_{1A}$ and $L_{2A}$ of one phase of the sources connected to plugs 13, 14. Relay coil 85 is connected between the lines $L_{1B}$ and $L_{2B}$ of the phase of the sources connected to the plugs 13, 14. Thus, if both sources are of the same voltage and phase, no voltage will be sensed across relay coils 84, 85 and they will remain de-energized.

By way of contrast, if one of the sources is out of phase with respect to the other, if one the sources is connected in reverse polarity, or if one of the sources is of a different voltage than the other, a voltage will appear across one, the other, or both of the relay coils 84, 85, energizing that relay with consequences to be described below.

It is seen that a pair of contacts from each of the relays 84, 85 are connected in the main output contact closing circuit, contacts 84a, 85a being connected in series and in normally closed relationship such that when the remainder of the main contact closing circuit is completed, power can be supplied to main switching relays 86, 87 to energize such relays. If, however, either of the relays 84 or 85 is energized, the associated contacts 84a, 85a will switch to the alternate (open) condition, preventing the energization of the main switching relays 86, 87. In addition, power will be provided to a fault branch 90 which serves to illuminate a fault indicator 91, preferably in the form of a red LED, indicating that the phase, voltage or polarity relationship between the sources is inappropriate. Illumination of the indicator 91 thereupon informs the user that one or both of the sources is inappropriate for the connection. In addition, it prevents operation of the output switching means, so that the inputs will not be summed or switched to the output. The user is thereby advised that one or both of the input plugs 13, 14 should be reconnected to another source, the fact that the indicator 91 is glowing indicating that the output will not be powered for so long as the indicator remains glowing.

Additional contacts 84b, 85b associated with the sensing relays 84, 85 are connected in series in normally closed fashion in a further circuit intended to complete an energization path to a time delay relay 88. It is seen that contacts 80c and 96c are also connected in that series circuit. It is recalled that the coil 80 is energized when both plugs are connected to live sources, coil 96 is energized when plug 14 is connected to a live source, and thus closure of the contacts 80c (in the presence of the continued closure of contacts 84b, 85b), will complete a circuit to relay coil 88. Thus, if both circuits are live and polarities and phases are appropriate, the coil 88 will be energized. After a short time delay of about one second, the contacts 88a associated with coil 88 will close, completing the main output contact closing circuit, to energize coils 86 and 87 which are the switching elements of that circuit. It is seen that the main output contact closing circuit includes the series connection of contacts 84a, 85a (which when the sources are as desired), contacts 82b and 96b (which are closed when the plug 14 is connected to a live source), and contact 88a, which is closed after a time delay upon energization of the relay coil 88. Thus, when those conditions are satisfied, the main output contact closing circuit will be completed, energizing relay coils 86, 87 and in addition illuminating an indicator 94. The indicator 94 is preferably a green LED intended to signal to the user that the connections are appropriately made, the source relationship has been appropriately sensed, and the input sources are connected as desired to drive the output.

Energization of coils 86 and 87 closes sets of power contacts 86a–c, 87a–c to connect the parallelled input sources to the output plug 16. It is seen that contacts 86a, 87a is connect the A phases together, contacts 86b, 87b connect the B phase together, and contacts 86c, 87c connect the neutrals together, such that the two sources are connected in parallel and to the output plug 16 to provide a service of greater current capacity to the load 8.

When the plugs are inserted in the opposite order, i.e., plug 13 inserted before plug 14, the same sequence will result. More particularly, it is seen that when plug 13 is inserted, it is not possible to energize relay coil 80 because of the normally open condition of contacts 82a. Thus, the sequence does not begin until plug 14 is connected to a live source, whereupon relay coil 96 is energized to initiate the sequence described in detail above.

Whenever one of the plugs is disconnected from a live source (or the source breaker opens), the system will respond by disconnecting both sources from each other and from the load. More particularly, it is seen that if plug 14 is disconnected from a live source, relay coil 96 will be de-energized. That will serve to open contacts 96b in the main output contact closing circuit, de-energizing coils 86, 87 and opening the output contacts. Similarly, if plug 13 is disconnected from a live source, the relay coil 88 will be de-energized, also opening a set of contacts in the main output contact closing circuit with a similar result.

As in the prior embodiment, the indicators 40, 41 provide a display to the user that the source associated with the plug is live. The indicator 94 is an indication that the internal circuitry has determined not only that the sources are live but that they are in the proper relationship and thus the output switching means has been activated to connect the summed sources to the output. Indicator 91 is a trouble indicator in the illustrated embodiment and, when illuminated, indicates to the user that the source relationships are inappropriate and the output switching means will not be closed. The substantial amount of information provided to the user by the array of indicator means will thus be apparent.

Having thus described several embodiments of the invention, it will be appreciated that it is possible to connect multiple sources to a single output in a relatively high power environment without endangering the user, and while providing the user significant indication of any inappropriate connection. Embodiments have been described which provide summation of voltages from a pair of out-of-phase power sources, in order to provide an output voltage which is higher (usually twice as high) as the voltage of either input source. In a second embodiment, a pair of power sources of the same phase are connected in parallel to provide an output service having a current capacity which is substantially higher (usually twice as high) as that of either input source.

It will also now be appreciated that a system according to the invention provides substantial safety to the user in that all of the plugs are "dead" during the connection operation. Even when one of the input plugs is installed into the socket of a live electrical source, both the output plug and the other input plug remain deactivated. The indicator means provide the user, even the inexperienced user, with adequate information to determine the nature of a problem if the connection is not properly made. In the preferred implementation, separate indicator means are associated with each of the input lines to provide independent appraisal to the user that each of the input lines is live. Separate output indicator means also indicates to the user, when illuminated, that the inputs are not only live, but they are in the proper relationship, and the sensing means has responded by activating the output means.

The ability provided by the system to simply, efficiently and safely connect a mobile vehicle, such as a pleasure craft, containing substantial electrical equipment, to a stationary source of power, such as a power pedestal at a marina, without endangering the user or requiring substantial amounts of his attention or skill, will now be apparent.

What is claimed is:

1. An adapter for connecting an electrical load requiring a predetermined voltage level to a pair of electrical sources at a lower voltage level, the adapter serving to sum the sources in a predetermined manner to produce the desired predetermined voltage level output, the adapter comprising in combination:

first and second connectors for connection to the respective electrical sources, first and second isolation means associated with the first and second connectors, each isolation means including at least two conductors independent of the conductors of the other isolation means, the two independent conductors of each isolation means being connected so that the respective isolation means senses a potential across two lines of a connected electrical source to determine therefrom whether the connected electrical source is live, the conductors of each isolation means being independent of the conductors of the other isolation means so that there is no direct electrical connection between said conductors of the respective isolation means and the two isolation means preventing feedthrough of one electrical source to the other connector when only one of the source connections is made, sensing means for summing the voltages form the first and second connectors and determining form the sum that the sources are out of phase and will sum to the predetermined level, and mechanical contacts isolating an output connector from the electrical sources, the mechanical contacts being operatively coupled to the sensing means so as to be closed in response to the sensing means determining that the sources sum to the predetermined level, thereby to couple the sources to the output only when the sources sum to the desired level.

2. The combination as set forth in claim 1 wherein the sensing means is so constructed and arranged as to sum the RMS voltages form the respective sources to assure that the respective sources are of different phase in order to produce a summed voltage of the predetermined level.

3. The combination as set forth in claim 1 wherein the sensing means comprises polarity sensitive means so constructed and arranged as to sense the relative polarities of the respective sources thereby to detect a source whose polarity is improperly connected.

4. An adapter for connecting an electrical load of a given characteristic to a pair of electrical sources of a characteristic different for the given characteristic, the adapter serving to sum the sources in a predetermined manner to produce a desired output, the adapter comprising, in combination:

first and second connectors for connection to the respective electrical sources, first and second isolation means associated with the first and second connectors, each isolation means including at least two conductors independent of the conductors of the other isolation means, the two independent conductors of each isolation means being connected so that the respective isolation means senses a potential across two lines of a connected electrical source to determine therefrom whether the connected electrical source is live, the conductors of each isolation means being independent of the conductors of the other isolation means so that there is no direct electrical connection between said conductors of the respective isolation means and the two isolation means preventing feedthrough of one electrical source to the other connector when only one of the source connections is made, sensing means for responding to a relationship between the sources which indicates that the sources will sum to produce the desired output, output means responsive to the sensing means for connecting the summed inputs to the output for driving an electrical load connected thereto, the isolation means comprising individual optoisolators coupled to the respective sources, and switch means responsive to the outputs of both said optoisolators for enabling the sensing means when both source connections are made, and the sensing means comprising means for responding to the sum of the source voltages for indicating that the sources will sum to produce an output voltage which is about twice the level fo the source voltage.

5. An adapter for connecting an electrical load of a given characteristic to a pair of electrical sources of a characteristic different for the given characteristic, the adapter serving to sum the sources in a predetermined manner to produce a desired output, the adapter comprising, in combination:

first and second connectors for connection to the respective electrical sources, first and second isolation means associated with the first and second connectors, each isolation means including at least two conductors independent of the conductors of the other isolation means, the two independent conductors of each isolation means being connected so that the respective isolation means senses a potential across two lines of a connected electrical source to determine therefrom whether the connected electrical source is live, the conductors of each isolation means being independent of the conductors of the other isolation means so that there is no direct electrical connection between said conductors of the respective isolation means and the two isolation means preventing feedthrough of one electrical source to the other connector when only one of the source connections is made, sensing means for responding to a relationship between the sources which indicates that the sources will sum to produce the desired output, output means responsive to the sensing means for connecting the summed inputs to the output for driving an electrical load connected thereto, and the sensing means comprising means for responding to the relative phase of the two electrical sources to indicate that the sources are out of phase and will sum to produce a voltage level higher than the voltage levels of the sources.

6. An adapter for connecting an electrical load of a given first characteristic to a pair of electrical sources of a second characteristic different for the given first characteristic, the adapter serving to sum the sources in a predetermined manner to produce a desired output, the adapter comprising, in combination:

first and second connectors for connection to the respective electrical sources, first and second isolation means associated with the first and second connectors, each isolation means including at least two conductors independent of the conductors of the other isolation means, the two independent conductors of each isolation means being connected so that the respective isolation means senses a potential across two lines of a connected electrical source to determine therefrom whether the connected electrical source is live, the conductors of each isolation means being independent of the conductors of the other isolation means so that there is no direct electrical connection between said conductors of the respective isolation means and the two isolation means preventing feedthrough of one electrical source to the preventing feedthrough of one electrical source to the other connector when only one of the source connections is made, sensing means for responding to a relationship between the sources which indicates that the sources will sum to produce the desired output, output means responsive to the sensing means for connecting the summed inputs to the output for driving an electrical load connected thereto, and said given first characteristic being voltage level, the electrical sources having voltage levels which are lower than the voltage level required by the electrical load, the sensing means comprising means for sensing an out-of-phase condition of the sources adequate to provide an output voltage level of the magnitude required by the electrical load.

7. An adapter for connecting an electrical load of a given characteristic to a pair of electrical sources of a characteristic different for the given characteristic, the adapter serving to sum the sources in a predetermined manner to produce a desired output, the adapter comprising, in combination:

first and second connectors for connection to the respective electrical sources, first and second isolation means associated with the first and second connectors, each isolation means including at least two conductors independent of the conductors of the other isolation means, the two independent conductors of each isolation means being connected so that the respective isolation means senses a potential across two lines of a connected electrical source to determine therefrom whether the connected electrical source is live, the conductors of each isolation means being independent of the conductors of the other isolation means so that there is no direct electrical connection between said conductors of the respective isolation means and the two isolation means preventing feedthrough of one electrical source to the other connector when only one of the source connections is made, sensing means for responding to a relationship between the sources which indicates that the sources will sum to produce the desired output, output means responsive to the sensing means for connecting the summed inputs to the output for driving an electrical load connected thereto, and wherein the relationship sensed by the sensing means is the relative phase of the sources, the sensing means comprising a voltage sensitive relay for determining that the sources are of different phases so as to produce a summed voltage greater than the voltage of either of the sources.

8. An adapter for connecting an electrical load of a given characteristic to a pair of electrical sources of a characteristic different for the given characteristic, the adapter serving to sum the sources in a predetermined manner to produce a desired output, the adapter comprising, in combination:

first and second connectors for connection to the respective electrical sources, first and second isolation means associated with the first and second connectors, each isolation means including at least two conductors independent of the conductors of the other isolation means, the two independent conductors of each isolation means being connected so that the respective isolation means senses a potential across two lines of a connected electrical source to determine therefrom whether the connected electrical source is live, the conductors of each isolation means being independent of the conductors of the other isolation means so that there is no direct electrical connection between said conductors of the respective isolation means and the two isolation means preventing feedthrough of one electrical source to the other connector when only one of the source connections is made, sensing means for responding to a relationship between the sources which indicates that the sources will sum to produce the desired output, output means responsive to the sensing means for connecting the summed inputs to the output for driving an electrical load connected thereto, and wherein the relationship sensed by the sensing means is the relative phase of the sources, the sensing means including phase-to-phase connected relay means adapted to be energized when the phase-to-phase voltage difference between the sources indicates that the sources are of different phase.

9. An adapter for connecting an electrical load to a stationary power supply in which the mobile load requires power at a predetermined level satisfied by summing a pair of sources from the stationary power supply, the adapter serving to sum the sources to produce an output at the predetermined level, the adapter comprising, in combination:

a junction box from which extend input cable means for connection to the stationary power supply and an output cable for connection to the mobile load, the input cable means including a pair of independent connectors for connection to first and second electrical sources in the stationary power supply, the output cable including a connector for connection to the mobile load, said pair of connectors being adapted for manual insertion into respective outlets of the stationary power supply, first and second isolation mean sin the junction box associated with the first and second connectors, each isolation means including at least two conductors independent of the conductors of the other isolation means, the two independent conductors of each isolation means being connected so that the respective isolation means senses a potential across two lines of a connected electrical source to determine therefrom whether the connected electrical source is live, the conductors of each isolation means being independent of the conductors of the other isolation means so that there is no direct electrical connection between said conductors of the respective isolation means and the two isolation means preventing feedthrough of power from one of the electrical sources to the other input connector when only one source connection is made, indicator means on the junction box for signalling that the input connections are connected to the electrical sources and that the respective sources are live, p1 connections in the junction box for summing the power from the respective sources, sensing means associated with the connections for determining that the sources will sum to produce the predetermined level required by the mobile load, output means including a set of mechanical contacts for connecting the summed sources to the mobile load, the output means including means responsive to the sensing means for closing the contacts only if the sensing means detects that the summed sources are at a level adequate to drive the mobile load, and wherein the pair of power sources are at a given voltage level and the predetermined level required by the load is at a higher voltage level satisfied by summing out-of-phase sources, the sensing means comprising means for determining if the voltage of the summed sources is of a level sufficient to drive the mobile load.

* * * * *